United States Patent
Che

(10) Patent No.: US 7,538,963 B2
(45) Date of Patent: May 26, 2009

(54) SYSTEM, METHOD, AND APPARATUS FOR MONITORING STRAY MAGNETIC FIELDS AND PROTECTING DISK DRIVES THEREFROM

(75) Inventor: Xiaodong Che, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 436 days.

(21) Appl. No.: 11/389,827

(22) Filed: Mar. 27, 2006

(65) Prior Publication Data

US 2007/0223128 A1    Sep. 27, 2007

(51) Int. Cl.
 *G11B 19/04*    (2006.01)
(52) U.S. Cl. .................................... 360/69
(58) Field of Classification Search .............. None
 See application file for complete search history.

(56) References Cited

U.S. PATENT DOCUMENTS

| 5,307,228 | A  | * | 4/1994  | Grasty ........................ 360/132 |
| 6,738,216 | B2 | * | 5/2004  | Kawana et al. ................ 360/75 |
| 6,873,484 | B2 |   | 3/2005  | Atsumi |
| 2002/0034029 | A1 |   | 3/2002 | Aoyagi et al. |
| 2002/0141109 | A1 |   | 10/2002 | Nguy |
| 2004/0075929 | A1 | * | 4/2004 | Shimizu et al. ............... 360/60 |
| 2006/0092543 | A1 | * | 5/2006 | Che et al. ..................... 360/60 |
| 2008/0130165 | A1 | * | 6/2008 | Partee ..................... 360/97.02 |

FOREIGN PATENT DOCUMENTS

| EP | 0546312 A1 |   | 6/1993 |
| JP | 59119515 |   | 7/1984 |
| JP | 3242866 |   | 10/1991 |
| JP | 07225901 A | * | 8/1995 |
| JP | 2003272331 A | * | 9/2003 |
| JP | 2003345627 |   | 12/2003 |
| JP | 2004005839 |   | 1/2004 |
| JP | 2004095071 |   | 3/2004 |
| WO | WO 03/058621 A1 | * | 7/2003 |

* cited by examiner

*Primary Examiner*—Hoa T Nguyen
*Assistant Examiner*—James L Habermehl
(74) *Attorney, Agent, or Firm*—Bracewll & Giuliani LLP

(57) ABSTRACT

A disk drive that protects stored data from stray magnetic fields is disclosed. Sensors for sensing stray magnetic fields are mounted to the base and/or cover of the drive and aligned with the trajectory of the movement of the read/write head. If the sensors, which have memory such as a toggle switch, are exposed to a high stray magnetic field, operation of the drive is suspended until a follow-up algorithm or protocol is implemented. The sensors can sense specific direction of stray fields. The sensor can change resistance if a high stray field is detected. The information in the sensors is collected and processed by the drive controller.

23 Claims, 2 Drawing Sheets ically supports the head and any electrical connections between the
SYSTEM, METHOD, AND APPARATUS FOR MONITORING STRAY MAGNETIC FIELDS AND PROTECTING DISK DRIVES THEREFROM

BACKGROUND OF THE INVENTION

1. Technical Field

The present invention relates in general to disk drives and, in particular, to an improved system, method, and apparatus for a protective means for minimizing the damage done to recorded data in a disk drive due to stray magnetic fields.

2. Description of the Related Art

Data access and storage systems generally comprise one or more storage devices that store data on magnetic or optical storage media. For example, a magnetic storage device is known as a direct access storage device or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one or more disks are stacked vertically on a common spindle that is turned by a disk drive motor at several thousand rpms. Hard disk drives have several different typical standard sizes or formats, covering server, desktop, mobile, and consumer electronics applications.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of air bearing surfaces that enable the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a rigid actuator arm that supports the entire head flying unit. Several rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The disk is mounted and clamped to a hub of a motor. The hub provides a disk mounting surface and a means to attach an additional part or parts to clamp the disk to the hub. In most typical motor configurations of HDDs, the rotating part of the motor is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

Unfortunately, the data recorded in a disk drive can be erased when exposed to high stray magnetic fields, especially during a writing operation. Coercivity (measured in Oersteds, Oe) is a property of magnetic material and is defined as the strength of magnetic field necessary to reduce the magnetization in the material to zero. The higher the coercivity, the harder it is to erase data from a medium. The concern of stray field data erasure is increased with perpendicular recording technology. Some configurations permit data to be erased by a stray magnetic field as low as 25 Oe. Thus, an improved means for protecting drives by minimizing the damage done to recorded data in a disk drive due to stray magnetic fields would be desirable.

SUMMARY OF THE INVENTION

One embodiment of a system, method, and apparatus for protecting data stored in disk drives from stray magnetic fields is described. The present invention utilizes one or more sensors for sensing stray magnetic fields. The sensors are mounted to the base or cover of the drive and aligned with the natural trajectory of the movement of the head on the actuator arm. Each sensor has memory, such as a toggle switch. If a sensor is exposed to a significantly high stray magnetic field, operation of the drive is suspended until a follow-up algorithm or protocol is implemented. The sensors can sense specific direction of stray fields. In one version, the sensor is based on a GMR reader in which a change in resistance is observed if a high stray field is present. The information (e.g., resistance) of the sensors is collected and processed by the drive controller.

In one embodiment, the sensors are set in an "off" position when the drive is manufactured. A certain threshold level is tuned so that the sensor will switch to an "on" position when a stray field exceeds a predetermined limit. At every drive power-on operation, the sensors are checked. If any of the sensors have been triggered, the drive goes through a predefined verification process to insure the integrity of any stored data. During drive operations, the sensors are monitored in real time. If some of the sensors are triggered, write or read operations are terminated to prevent stray field erasure of the stored data. The sensors also are used to report any exposure to high stray fields that may occur during shipment or other transportation of the drive. Once any damaged drives are identified, servo and other system-level signals are verified and the shipping procedure can be reviewed.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
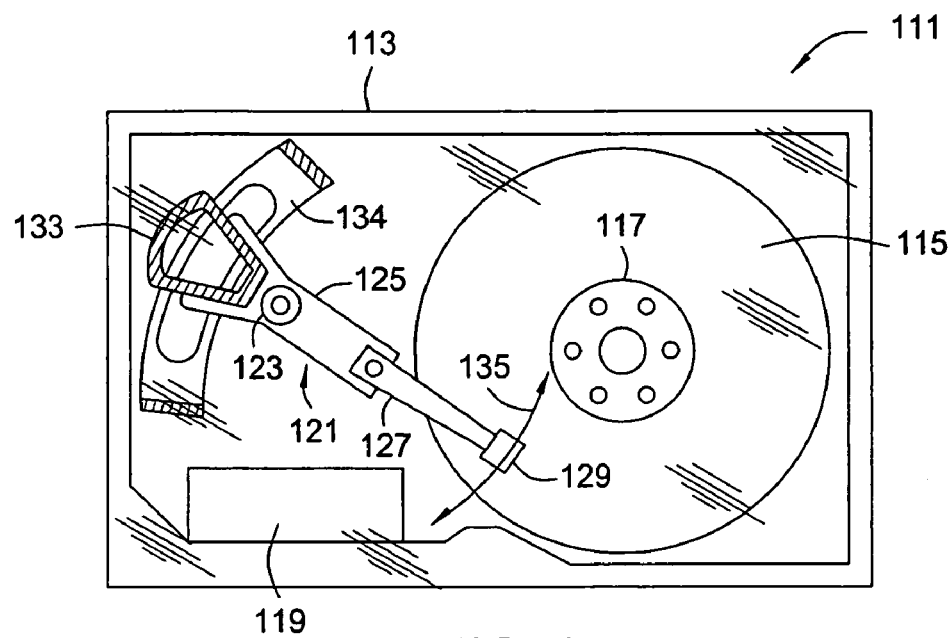
FIG. 1 is a schematic plan view of one embodiment of a disk drive constructed in accordance with the present invention.

Referring to FIG. 1, a schematic drawing of one embodiment of an information storage system comprising a magnetic hard disk file or disk drive 111 for a computer system is shown. Drive 111 includes an outer housing or enclosure including a base 113 containing at least one magnetic disk 115. Disk 115 is rotated by a spindle motor assembly having a central drive hub 117. An actuator 121 comprises a plurality of parallel actuator arms 125 in the form of a comb that is pivotally mounted to base 113 about a pivot assembly 123. A controller 119 is also mounted to base 113 for controlling the disk drive 111, such as selectively moving the actuator 121 relative to the disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. In one embodiment, the head is typically formed from ceramic or intermetallic materials. In another embodiment, the head may be pre-loaded against the surface of disk 115 (in the range two to ten grams) by suspension 127.

Suspensions 127 have a spring-like quality that biases with a pre-determined force to urge the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 manipulates the head radially across tracks on the disk 115 in a radial trajectory or arc 135 until the heads settle on their respective target tracks. The head gimbal assemblies operate in a conventional manner and always move in unison with one another, unless drive 111 uses multiple independent actuators (not shown) wherein the arms can move independently of one another.

Figure 2:
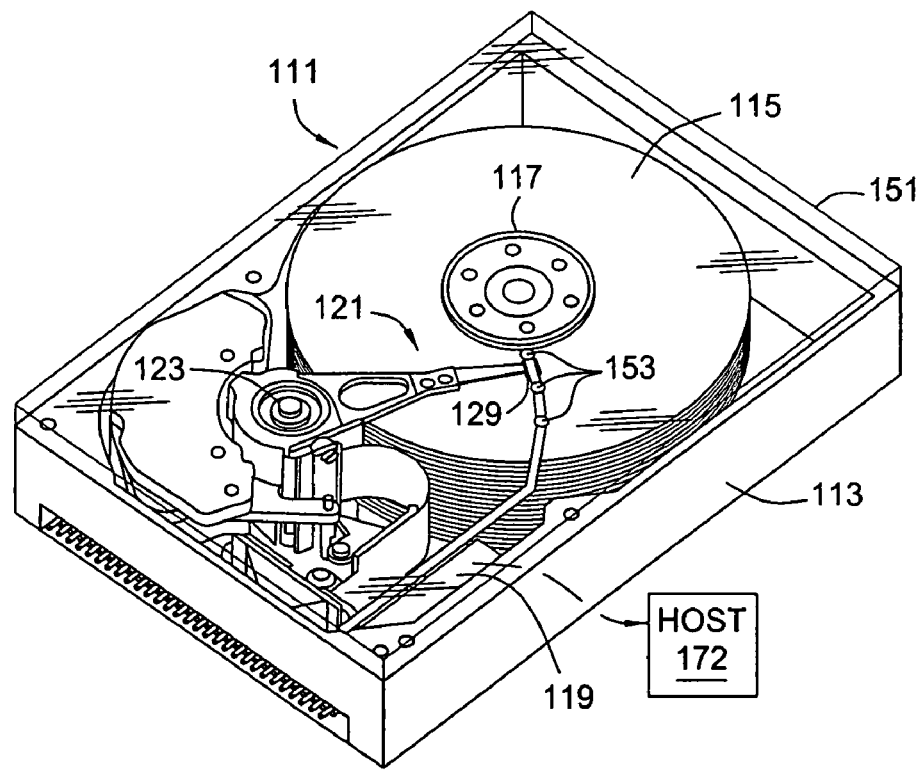
FIG. 2 is a schematic isometric view the disk drive of FIG. 1 and is constructed in accordance with the present invention.

Referring to FIG. 2, in one embodiment the system, method, and apparatus for disk drives to detect and respond to exposure to stray magnetic fields is shown and constructed in accordance with the present invention. In the illustrated embodiment, the enclosure includes a cover 151 for base 113. For ease of understanding, the cover 151 is illustrated as transparent to show interior features of the present invention. The cover 151 and base 113 enclose an interior of the disk drive 111 and define an exterior thereof as that which is external to the enclosure.

The present invention also comprises one or more sensors 153 (e.g., three shown). In the embodiment shown, the sensors 153 are mounted to the cover 151 in a pattern that aligns with a trajectory 135 (FIG. 1) of the head 129. In one embodiment, the trajectory is defined as the radial arc through which the head 129 moves about a pivot point 123 of the actuator 121.

The sensors 153 monitor extreme stray magnetic fields that originate exterior to the enclosure during reading and writing operations. In addition, the sensors 153 also monitor the disk drive's 111 exposure to stray magnetic fields during non-operation of the disk drive 111 to protect data integrity and disk drive reliability. The sensors 153 are monitored by controller 119 during operation and non-operation of the disk drive 111, such that the sensors 153 can detect stray magnetic fields when no power is supplied to the disk drive 111 in a non-operational state (e.g., during shipment, transportation, etc. of the disk drive 111).

The sensors 153 are used to detect specified levels of stray magnetic fields (e.g., in excess of about 100 Oe, in one embodiment). Each sensor 153 may comprise memory (e.g., a toggle switch) and, when one or more of the sensors 153 is exposed to a significantly high stray magnetic field, operation of the disk drive 111 is suspended until a follow-up algorithm is implemented to protect data integrity and disk drive reliability. In one embodiment, the sensors 153 are GMR readers in which a change in resistance is observed when one or more of the sensors 153 is exposed to a stray magnetic field. The change in resistance of the sensor 153 is collected and processed by the controller 119. Moreover, each of the sensors 153 can sense a specific direction of a stray magnetic field.

Figure 3:
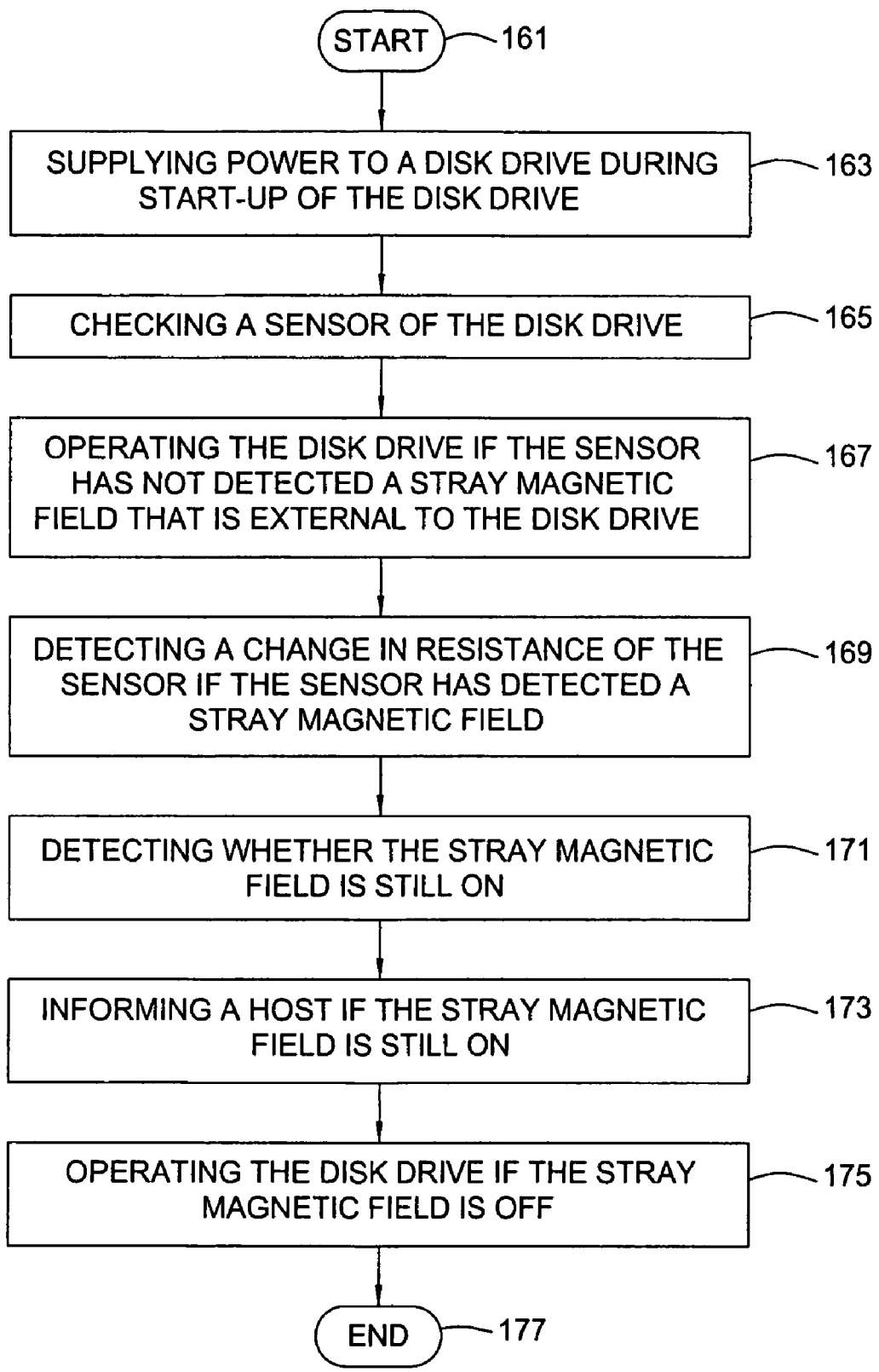
FIG. 3 is a high level flow diagram of one embodiment of a method constructed in accordance with the present invention.

Referring now to FIG. 3, the present invention also comprises a method of detecting exposure of a disk drive to stray magnetic fields. In one embodiment, the method begins as indicated at step 161, and comprises supplying power to a disk drive during start-up of the disk drive (step 163); checking one or more sensors of the disk drive (step 165); operating the disk drive if the sensor has not detected a stray magnetic field that is external to the disk drive (step 167); detecting a change in resistance of the sensor if the sensor has detected a stray magnetic field (step 169); detecting whether the stray magnetic field is still on (step 171); informing a host 172 (see FIG. 2) if the stray magnetic field is still on (step 173); and, if no stray magnetic field is detected, operating the disk drive (step 175), before ending as indicated at step 177.

During writing operations of the disk drive, one embodiment of the method may further comprise checking the sensor for detection of a stray magnetic field and performing reading/writing operations if no stray magnetic field is detected, and, if a stray magnetic field is detected, not performing reading/writing operations and informing the host. The method may further comprise rechecking the sensor after reading/writing to each sector of the disk drive.

The method may further comprise performing an algorithm to control write operations of the disk drive to minimize exposure of write-stressed stray field erasure; and/or setting the sensor in an "off" position when the disk drive is manufactured, and switching the sensor to an "on" position when a stray field exceeds a predetermined limit; and/or checking the sensor at every disk drive power-on operation and, if the sensors has been triggered by a stray magnetic field, executing a predefined verification process to insure the integrity of any stored data and other drive pre-recorded system information (e.g., servo patterns, gray code, defect mapping table, etc.) in the disk drive. In one embodiment, the sensor is a passive device that is still functional even when power is not supplied to the disk drive. The sensor is monitored in real time, and records detection of the stray magnetic even when the disk drive is non-operational, such that any change in resistance in the sensor is evaluated when power is resupplied to the disk drive.

In one embodiment, the following procedures are used for power-up of the drive:
1. Check sensor. If no stray field detected, spin-up and operation;
2. Check sensor. If change in resistance, check whether the stray field is still on: if yes, inform host; if no, system verification and operation.

During writing:
1. Check sensor. If no, start writing. After one sector, check sensor again (repeat);
2. Check sensor. If yes, do not write and inform host.

During reading:
1. Check sensor. If no, start reading. After one sector, check sensor again (repeat);
2. Check sensor. If yes (threshold may or may not be different from write operation based on HDD manufacturer's internal test results), do not read and inform host.
3. Algorithm to control write operation to minimize exposure of write-stressed stray field erasure.

The present invention has several advantages, including the ability to protect data stored in disk drives from stray magnetic fields. If the drive is exposed to high stray magnetic fields, operation of the drive is suspended until a follow-up algorithm or protocol is implemented. This invention also takes advantage of the existing drive controller to collect and process the necessary information. The drive is checked at every power-on operation. If a field is detected, the drive goes through a predefined verification process to insure the integrity of any stored data. During drive operations, the sensors are monitored in real time. Unlike the prior art, this design reports any exposure to high stray fields that may occur during shipment, transportation, or other nonoperational events in the life of the disk drive.

While the invention has been shown or described in only some of its forms, it should be apparent to those skilled in the art that it is not so limited, but is susceptible to various changes without departing from the scope of the invention.

What is claimed is:

1. A disk drive, comprising:
   an enclosure having an interior and an exterior;
   a disk rotatably mounted to the disk drive;
   an actuator movably mounted to the disk drive and having a head movable relative to the disk for reading data from and writing data to the disk;
   a sensor mounted to the disk drive for monitoring stray magnetic fields originating exterior to the enclosure during reading and writing operations, and during non-operation of the disk drive to protect data integrity and disk drive reliability;
   a controller for controlling operations of the disk drive and monitoring the sensor during non-operation of the disk drive; and wherein
   the sensor detects stray magnetic fields during shipment of the disk drive when no power is supplied to the disk drive in a non-operational state.

2. A disk drive according to claim 1, wherein the sensor comprises a plurality of sensors arrayed in a spaced-apart pattern relative to each other.

3. A disk drive according to claim 1, wherein the sensor is on a cover of the enclosure and is aligned with a trajectory of the head.

4. A disk drive according to claim 3, wherein the trajectory is defined as radial arc through which the head moves about a pivot point of the actuator.

5. A disk drive according to claim 1, wherein the sensor is a toggle switch, the sensor detects stray magnetic fields in excess of about 100 Oe, and the sensor senses a specific direction of stray magnetic fields, 6. A disk drive according to claim 1, wherein the sensor has memory and, when the sensor is exposed to a significantly high stray magnetic field, operation of the disk drive is suspended until a follow-up algorithm is implemented to protect data integrity and disk drive reliability.

7. A disk drive according to claim 1, wherein the sensor is a GMR reader in which a change in resistance is observed when the sensor is exposed to a stray magnetic field, and the change in resistance of the sensor is collected and processed by the controller.

8. A system of detecting stray magnetic fields, comprising:
   an enclosure having a base, a cover, an interior, and an exterior external to the enclosure;
   a disk rotatably mounted to the base in the interior of the enclosure;
   an actuator movably mounted to the base in the interior of the enclosure and having a head movable relative to the disk for reading data from and writing data to the disk;
   a plurality of sensors mounted to the cover in a pattern that aligns with a trajectory of the head for monitoring extreme stray magnetic fields originating exterior to the enclosure during reading and writing operations, and during non-operation of the disk drive to protect data integrity and disk drive reliability;
   a controller for controlling operations of the disk drive and monitoring the sensors during non-operation of the disk drive; and wherein
   the sensors detect stray magnetic fields during shipment of the disk drive when no power is supplied to the disk drive in a non-operational state.

9. A system according to claim 8, wherein the trajectory is defined as radial arc through which the head moves about a pivot point of the actuator.

10. A system according to claim 8, wherein the sensors detect stray magnetic fields in excess of about 100 Oe.

11. A system according to claim 8, wherein each of the sensor have memory and, when one or more of the sensors is exposed to a significantly high stray magnetic field, operation of the disk drive is suspended until a follow-up algorithm is implemented to protect data integrity and disk drive reliability.

12. A system according to claim 8, wherein each of the sensors is a toggle switch.

13. A system according to claim 8, wherein each of the sensors sense a specific direction of stray magnetic fields.

14. A system according to claim 8, wherein each of the sensors is a GMR reader in which a change in resistance is observed when one or more of the sensors is exposed to a stray magnetic field, and the change in resistance of said one or more of the sensors is collected and processed by the controller.

15. A method of detecting exposure of a disk drive to stray magnetic fields, the method comprising:
   (a) supplying power to a disk drive during start-up of the disk drive;
   (b) checking a sensor of the disk drive;

(c) operating the disk drive if the sensor has not detected a stray magnetic field that is external to the disk drive;

(d) detecting a change in resistance of the sensor if the sensor has detected a stray magnetic field;

(e) detecting whether the stray magnetic field is still on;

(f) informing a host if the stray magnetic field is still on;

(g) if no stray magnetic field is detected, operating the disk drive; and (h) detecting stray magnetic fields during shipment of the disk drive when no power is supplied to the disk drive in a non-operational state.

16. A method according to claim 15, wherein, during writing operations of the disk drive, checking the sensor for detection of a stray magnetic field and performing writing operations if no stray magnetic field is detected, and, if a stray magnetic field is detected at or above a selected threshold, not performing writing operations and informing the host.

17. A method according to claim 16, further comprising rechecking the sensor after writing to each sector of the disk drive.

18. A method according to claim 15, wherein, during reading operations of the disk drive, checking the sensor for detection of a stray magnetic field and performing reading operations if no stray magnetic field is detected, and, if a stray magnetic field is detected at or above a selected threshold, not performing reading operations and informing the host.

19. A method according to claim 18, further comprising rechecking the sensor after reading from each sector of the disk drive.

20. A method according to claim 15, further comprising performing an algorithm to control write operations of the disk drive to minimize exposure of write stress stray field erasure.

21. A method according to claim 15, further comprising setting the sensor in an "off" position when the disk drive is manufactured, and switching the sensor to an "on" position when a stray field exceeds a predetermined limit.

22. A method according to claim 15, checking the sensor at every disk drive power-on operation and, if the sensors has been triggered by a stray magnetic field, executing a predefined verification process to insure the integrity of any stored data and system information in the disk drive.

23. A method according to claim 15, wherein the sensor is a passive device, monitored in real time, and records detection of the stray magnetic even when power is not being supplied to the disk drive and the disk drive is non-operational, such that any change in resistance in the sensor is evaluated when power is resupplied to the disk drive.

\* \* \* \* \*